UNITED STATES PATENT OFFICE.

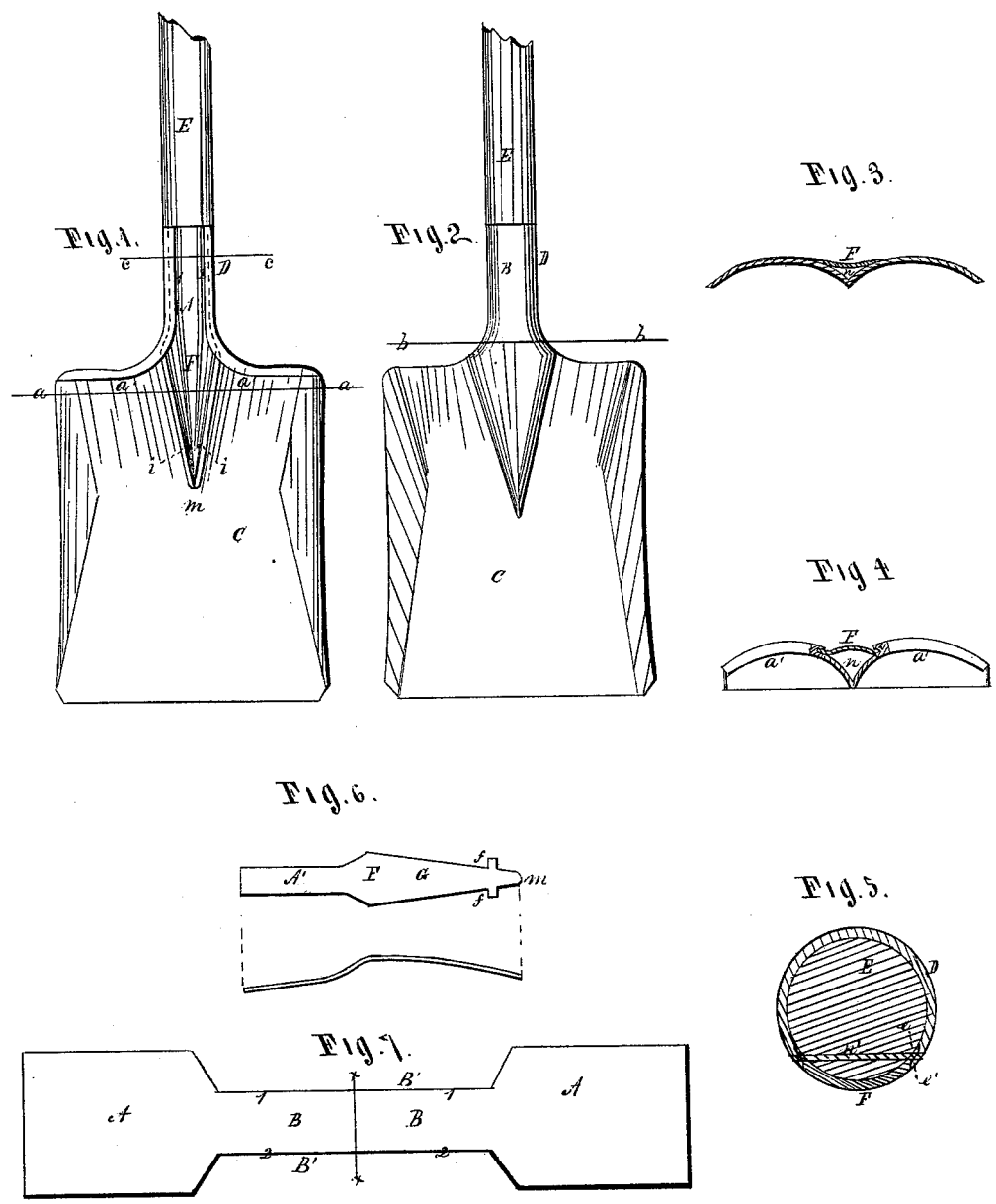

WILLIAM CHISHOLM, OF CLEVELAND, OHIO.

SHOVEL.

SPECIFICATION forming part of Letters Patent No. 229,520, dated July 6, 1880.

Application filed February 20, 1880.

*To all whom it may concern:*

Be it known that I, WILLIAM CHISHOLM, of Cleveland, in the county of Cuyahoga and State of Ohio, have invented certain new Improvements in Shovels, &c.; and I do hereby declare that the following is a full, clear, and complete description thereof.

This invention relates to an improvement in strap-shovels, scoops, pitchforks, and spades.

In the ordinary socketed shovel the blades and shanks consist of one piece of sheet metal, first cut into blanks and formed into shape by means of dies, one pair of which is adapted to give shape to the blade of the article and the other pair to form the socket or shank of the same.

That a full and complete understanding of my improvement may be had, reference will be made to the annexed drawings, making a part of this specification, in which—

Figure 1 represents the back of a shovel. Fig. 2 shows the front or upper side of the same. Fig. 3 is a transverse section taken through the line *a a*. Fig. 4 is a transverse section taken on line *b b*, Fig. 2. Fig. 5 is also a transverse section taken through the line *c c*. Fig. 6 is a detached section. Fig. 7 is a blank of the shovel and strap, and will be referred to hereinafter.

Like letters of reference refer to like parts in the several views.

As above said, the socketed shovels, &c., alluded to, and as manufactured by me, are each made of one piece of sheet metal. To this end a piece of metal is cut into a blank of the shape shown in Fig. 7, which is then divided through the line *x x*. The part A thereof is then formed by compressive dies into the blade of a shovel, scoop, or spade, as the case may be. The part B, by the action of other dies, is turned into a socket in which to insert the handle of the article when completed.

Shovels, &c., made in the manner as above described have a depression in the back near the junction of the socket or shank with the blade, as seen at *n* in Fig. 4. This hollow is partially filled by the end of the handle, which, when inserted in the socket, goes entirely through it, and projects therefrom into the hollow or depression in the back of the blade alluded to. The depression between the shoulders of the blade, though partially filled with the end of the handle, is still left largely open, which, on using the shovel, becomes filled up with dirt, thereby adding to the weight of the article and to the labor in using it.

The earth lodged in the hollow or depression referred to about the exposed end of the handle, together with the said end of the handle, requires increased effort to force the blade into the ground, and when used in damp or wet earth the dirt lodged in the depression rusts the blade of the shovel and tends to soften and rot the handle.

To avoid these objectionable features of the shovel is one purpose of this invention, which improvement is effected by covering the depression and the end of the handle therein by a back plate, which obviates the objections specified.

A shovel provided with the back plate alluded to is shown in Fig. 1, in which C represents the blade of a shovel, D the shank or socket, and E the handle. The said blade is or may be made in the usual way and of the ordinary shape, wherein the shank, instead of being formed into a complete socket, as is usually done, is but partially formed into such socket—that is to say, the section or part B, Fig. 7, of the blank, when bent to form the shank or socket in part, is not cut wide enough to allow the edges 1 and 2 to come together. Hence there is left a space between the two edges, as seen in Fig. 1, in which the numerals 1 and 2 correspond to the figures 1 and 2 in Fig. 7, which represents the metal of the shank flattened out.

The space left between the edges of the shank is filled by a section of the back plate F, Fig. 1, shaped to fit the curvature of the shank of the shovel at its junction with the blade. A detached view of said plate is shown in Fig. 6.

The width of the blade part G of the plate is sufficient to cover the width of the depression *n*, as seen in Fig. 4, and long enough to cover it longitudinally, as shown in Fig. 1.

In Figs. 3 and 4 it will be observed that the blade-section of the back plate is a little below the surface of the back of the shovel. Hence on pushing the implement into the earth the point *m* of the back plate is not liable to catch into the dirt and be torn from its connection with the shovel, to which it is made fast by welding or by rivets $i$. The back plate may, however, be secured to the blade by ears $f$, Fig. 6, projecting from either side of the point, which ears may be bent at right angles to the plane of the plate, so that they may enter holes in the shovel-blade and be riveted down upon the opposite side thereof.

The extension or shank part A' of the back plate is secured to the shank of the shovel, as shown in Fig. 1, in which it will be seen that the neck and shoulders of the shovel are provided, respectively, with a flange, $a'$, extending from the junction of the shank to the corners of the blade, as seen in Fig. 4, forming a rest for the foot of the person using the implement, and strengthening the neck and shoulders of the shovel.

The flange $a'$ laps down over the back plate, under which the curved neck or edges of the extension A' of the back plate pass, as indicated by the dotted lines in Fig. 1, and extending upward under the edges 1 and 2 of the shank, as the aforesaid dotted line indicates.

The extension of the back plate along under the edges of the shank fills the gap or space between the edges 1 and 2, thereby completing the socket for the handle, the end of which will be entirely covered by the back plate and all of the space of the depression above alluded to, thereby making the back of the shovel a smooth and unbroken surface, as shown in the drawings, and giving great additional strength to the article.

In order that the edges 1 and 2 of the shank of the shovel shall not be above the surface of the extension A', the inner edges, 1 and 2, of the shank are offset, forming a rabbet, as seen at $e$ in Fig. 5. A corresponding rabbet or offset is made along each edge of the extension of the back plate, as seen at $e'$ in said Fig. 5, thereby making a half-splice connection of the two parts, by which an even surface is obtained to the inner side, as shown in said Fig. 5, thus making the handle at its junction with the shank smooth to the hand and neat in appearance.

The handle is made fast in the socket by a pin or rivet, $n'$, passing through the edges of the shank and the edges of the extension of the back plate, substantially as shown in Fig. 5.

The back strap or plate may be either riveted or welded to the shovel-blade without departing from the nature of this improvement, and the flange or shoulder for the foot may be omitted from extending along the top edge of the shovel to the sides, or from the point where the lap of the flange extends down over the back strap, as seen at $a'$.

In welding the back strap to the shoulder it may be slightly curved over and along the back, corresponding with the swell of the shovel. In such case the shoulder or flange of the back plate or strap which receives the rivets to secure the parts together would not be needed. In making this improved back strap the waste cut out from the plate-blank at B' in first shaping for the dies is utilized by taking the piece thus cut out and shaping it, as seen in Fig. 6, so as to fit in the plate at the back of the shovel, forming the back strap, as before described. Thus the piece which has been heretofore wasted is utilized, strengthening and materially improving the article to which it is attached.

What I claim as my invention, and desire to secure by Letters Patent, is—

In shovels, the plate F, attached to the rear of the shovel-blade, extending through and forming part of the socket, jointly with the section B, with rabbets or offsets along said plate, shank, and section B, forming an even and smooth joint at the connection thereof for the socket, substantially as described, and for the purpose specified.

WILLIAM CHISHOLM.

Witnesses:
M. L. DEERING,
J. H. BURRIDGE.